May 4, 1954

H. A. DAHL 2,677,528

PURSE SEINE WINCH

Filed Sept. 22, 1948

INVENTOR.
Haldor R. Dahl
BY James E. Sproll
ATTORNEY.

May 4, 1954   H. A. DAHL   2,677,528
PURSE SEINE WINCH
Filed Sept. 22, 1948   7 Sheets-Sheet 4

INVENTOR.
Haldor A. Dahl
BY James E. Sproll
ATTORNEY.

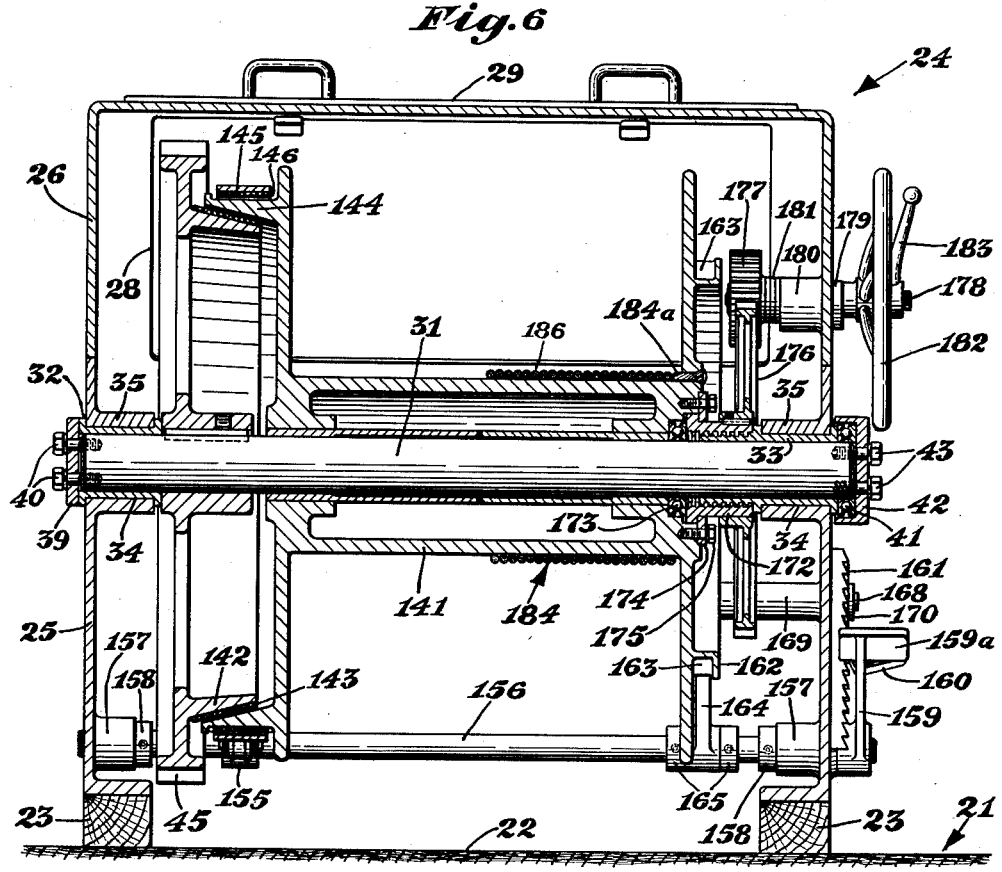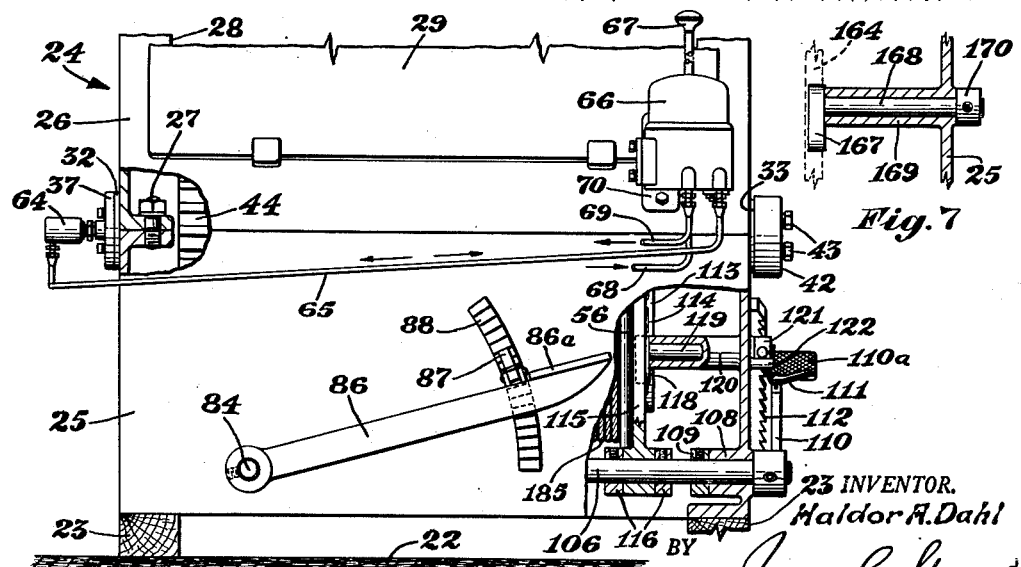

May 4, 1954
H. A. DAHL
2,677,528
PURSE SEINE WINCH
Filed Sept. 22, 1948
7 Sheets-Sheet 6
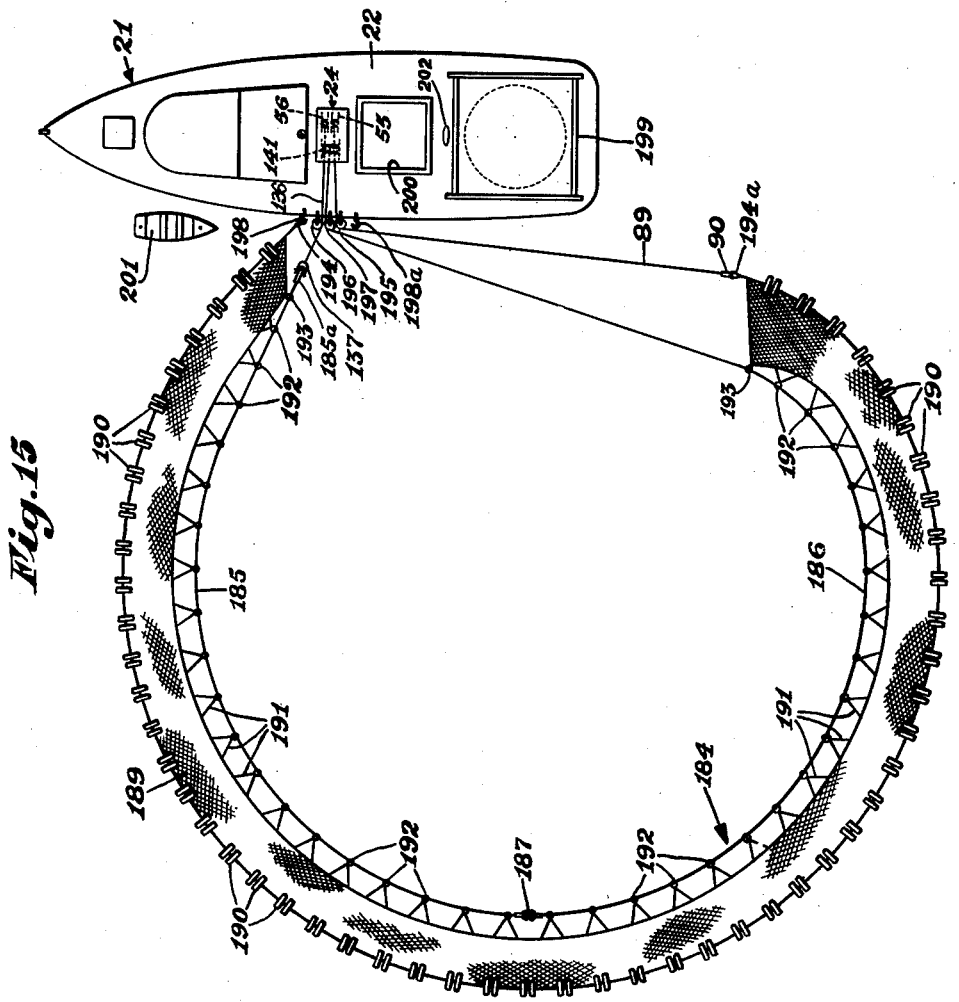
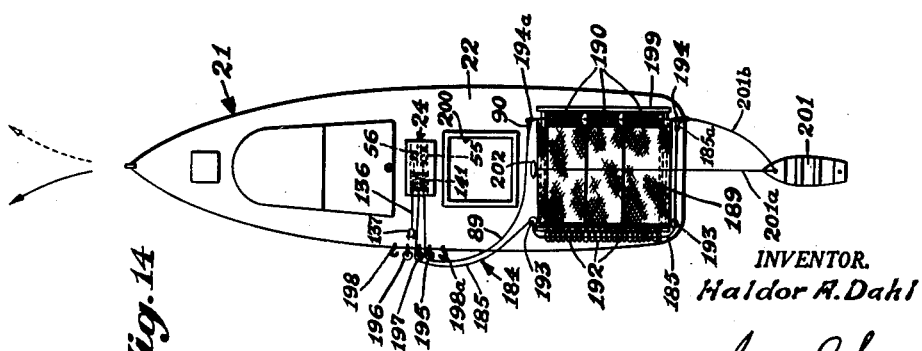
INVENTOR.
Haldor A. Dahl
BY James E. Sproll
ATTORNEY.

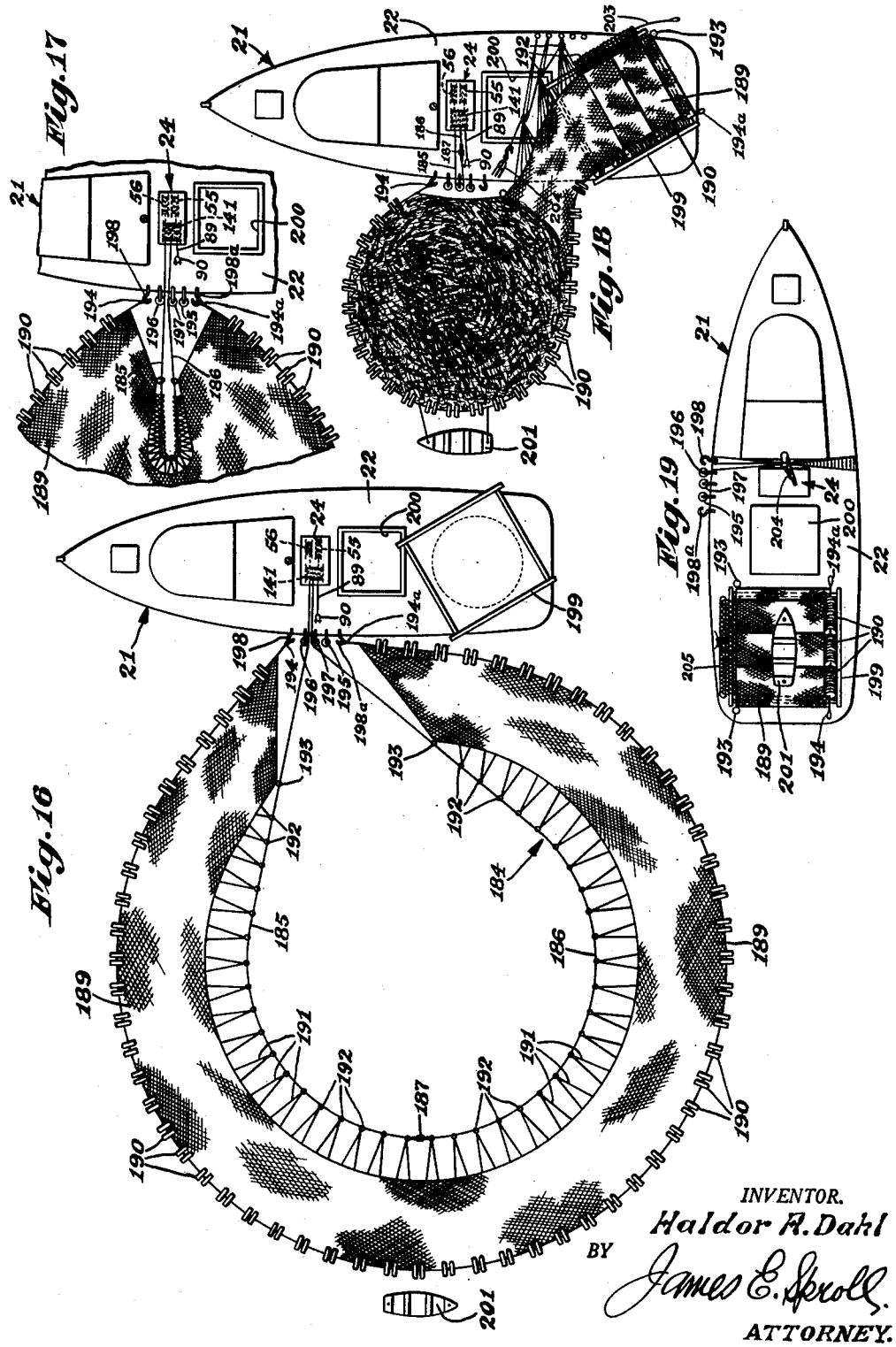

Patented May 4, 1954

2,677,528

UNITED STATES PATENT OFFICE 2,677,528

PURSE SEINE WINCH

Haldor A. Dahl, Tacoma, Wash., assignor to Tacoma Boatbuilding Co., Inc., Tacoma, Wash., a corporation of Washington Application September 22, 1948, Serial No. 50,560

6 Claims. (Cl. 254—137)

This invention relates to purse seine winches and to improvements in the art or method of purse seine fishing.

In purse seine fishing operations, as heretofore conducted, it has been customary to rely entirely and exclusively upon manual manipulation of the fishing gear, the only concession or resort to mechanical aid in this regard being the employment of power-driven gypsies usually a pair of same, which were, in most instances, mounted in axially spaced relation upon and keyed or otherwise fixedly secured to a single power-driven shaft and in consequence this type of mounting precluded any possibility of obtaining separate or individual control of these gypsies, which lack of separate control added materially to the difficulties of manually operating purse seine fishing gear as pointed out herebelow.

Certain inherent objections to and operative deficiencies in manual operation of purse seine fishing gear in addition to the foregoing have been noted, principally among which were: such manual operation required considerable equipment and a relatively large crew to accommodate and handle the fishing gear, as for example, in taking in slack of the tow and purse lines or cables of the purse seine and in preparation for the pursing of the same required the services of at least four to five men for the reason that in bringing said tow and purse lines or cables inboard it has formerly been the custom and practice to feed the same by hand upon the power-driven twin gypsies aforementioned and such mode of operation was not only slow but was extremely hazardous to the personnel and in the event a cable snapped or the "figure 8" coupling employed for connecting the halves of the purse line became entangled on one or other of the power-driven gypsies loss of the fishing gear and the fish catch frequently resulted; further such manual operation also lacked positive action and co-ordinated control, since, the entire action hinged upon the frictional engagement of five or six wraps, at the most, of the tow and purse lines or cables around the power-driven gypsies; still further in such manual operation of purse seine fishing gear serious impairment of the purse and tow lines or cables occurred, such as fraying and splintering of the strands of same, due to the excessive heat generated by the necessary and unavoidable slippage of the cables or lines upon the power-driven gypsies lacking separate and individual control, particularly during seine pursing operations, when if it was deemed desirable or expedient, for any reason, to haul inboard one leg only of the purse line and leave the other or opposite leg inactive on its rotating gypsy, and although various devices and means have heretofore been employed to dissipate the excessive heat generated in the manner just described and thus in turn minimize the impairment of or damage to the tow and purse lines or cables and also decrease hazards to personnel no notable success in this respect has been achieved, as an example of one of the best of such devices or means, water-cooled gypsies were substituted for the conventional type of gypsies, but even these were ineffectual in materially minimizing or preventing excessive overheating of and damage to the cables or lines; still further in manual operation of purse seine fishing gear as practiced hitherto no provision was made for the compact and efficient storage or stowage of the tow and purse lines or cables after the same had been unwrapped from the power-driven gypsies, the manner and method generally employed of disposing of such lines or cables being to wind the same upon a series of handcranked cable storage drums located in any available, not necessarily readily accessible, spaces on the purse seiner deck and/or deck house, which spaces in many instances were remote from the gypsies, the latter ordinarily being located to the best advantage for hauling the tow and purse lines or cables inboard; finally modern purse seine fishing gear in its development and evolvement up to the present time has progressively increased in weight, particularly since the introduction and use of steel cables with such fishing gear and for other reasons incidental thereto, until it has now become too cumbersome, heavy and impracticable to handle by hand.

It is, therefore, the primary object and principal purpose of the present invention to entirely dispense with manual handling of purse seine fishing gear with its attendant objections and deficiencies by providing a novel purse seine winch for handling purse seine fishing gear and also an improved method of purse seining employing such winch or the equivalent of same, whereby and wherewith the entire purse seine fishing operation is co-ordinated and is under the complete control of a single operator at all times.

Another and important object of the invention is the provision of a purse seine winch especially designed and particularly adapted to mechanically spool and stow the cables or lines of a purse seine fishing gear.

A further object is to provide a purse seine winch adaptable for and capable of independently paying out and hauling inboard the individual cables or lines of a purse seine fishing gear.

A still further object is to provide a purse seine winch adapted to effectively and positively control the action of the cables or lines of a purse seine fishing gear when in service without slippage and/or overheating of the same occurring and without imposing any undue wear thereon.

A still further object is the provision of a purse seine winch of large cable stowage capacity and wherein the purse seine cables are stowable in compact formation when not in service, but are readily accessible and available for service when and as required.

A still further object is to provide a purse seine winch in the use and operation of which all physical hazards to the boat crew generally and to the winch operator specifically have been substantially eliminated.

A still further object of the invention is to simplify, accelerate and/or expedite purse seine fishing operations.

The above, and additional objects which will hereinafter be more specifically treated are attained by such means as are shown in the accompanying drawings, described in the following specification and then more clearly pointed out in the claims, which are appended hereto and form a part of this application.

With reference to the drawings, in which there is illustrated one embodiment of the invention, and throughout the several views of which like characters of reference designate similar parts:

Fig. 2A is an enlarged fragmentary longitudinal vertical section taken on the line 2A—2A of Fig. 2;

Fig. 6 is a transverse vertical section of the winch taken substantially on the line 6—6 of Fig. 1, as it would appear when the seine purse line is outboard upon completion of a seine setting operation;

Fig. 7 is a fragmentary transverse vertical section taken on the line 7—7 of Fig. 1;

Fig. 8 is a fragmentary end elevation of the starboard end of the winch, with certain parts of same being broken away and certain other parts shown in section for illustrative clarity;

Fig. 9 is an enlarged fragmentary transverse vertical section taken on the line 9—9 of Fig. 3;

Fig. 10 is an enlarged fragmentary longitudinal vertical section taken on the line 10—10 of Fig. 4;

Fig. 11 is an enlarged fragmentary elevation of the port or tow and purse line lead-off end of the winch;

Fig. 12 is an enlarged fragmentary horizontal section taken on the line 12—12 of Fig. 3;

Fig. 13 is an enlarged fragmentary transverse vertical section taken on the line 13—13 of Fig. 1;

Fig. 14 is a schematic plan view illustrating a purse seiner equipped with the purse seine winch of the present invention and as it would appear with its fishing gear in position and readiness for a purse seine setting operation;

Fig. 15 is a similar view illustrating the manner of setting the purse seine;

Fig. 16 is also a similar view illustrating the manner of anchoring the purse seine to the side of the purse seiner upon completion of a seine setting operation and also the manner of effecting preliminary pursing of the seine after the latter has been anchored to the purse seiner;

Fig. 17 is a fragmentary schematic plan view illustrating the purse seine, as it would appear after it has been completely pursed and preparatory to the fish brailing operation and the progressive hauling inboard of the purse seine;

Fig. 18 is a schematic plan view illustrating the manner of constricting the purse seine and progressively hauling the same inboard during the fish brailing operation, and Fig. 19 is a similar view of the purse seiner with all of its fishing gear snugly secured or stowed inboard, as it would appear when returning from the fishing grounds.

Beginning now the more detailed description of the invention by reference to the accompanying drawings, wherein the numeral 21 designates a purse seiner, 22 the main deck of same and 23 support sills normally disposed in spaced parallel relation upon the deck 22 and anchored thereto, athwart or transversely of the purse seiner, in any suitable manner, not shown.

Figure 5:
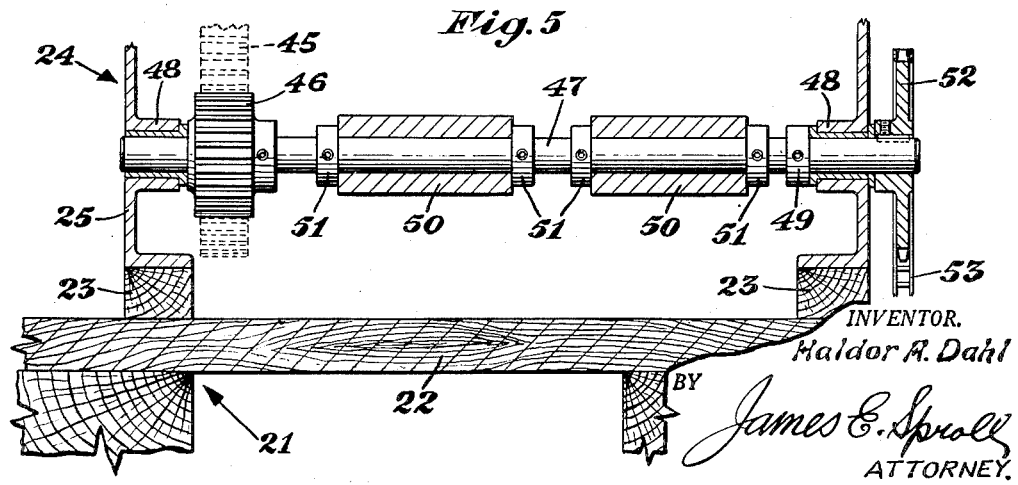
Fig. 5 is a fragmentary transverse vertical section taken on the line 5—5 of Fig. 1.

Mounted upon and anchored to the support sills 23 in any conventional or well known manner, not shown, is the purse seine winch 24 of the present invention, said winch being provided with a sectional casing for housing the mechanism of same and comprising an elongated rectangular lower or base section 25 and an elongated rectangular and semi-elliptical cover or upper section 26 adapted to be detachably secured to the lower section, as by studs 27, or the like, said sections for such purpose being interiorly flanged as shown in Fig. 8, and said lower section being also similarly flanged at its lower end for abutment with and support by the sills 23, as more clearly shown in Figs. 5 and 6. The cover section 26, adjacent the ends of the curvilinear upper wall of same, is provided with rectangular inspection openings 28 adapted to be normally closed by typical readily demountable inspection covers 29.

Drum shafts 30 and 31, respectively, are transversely disposed in spaced parallel relation within the sectional winch casing above described and have their terminal portions at a common end journalled for rotation within peripherally flanged bushings 32 and at their opposite or other common end have their terminal portions journalled for rotation within peripherally flanged and exteriorly threaded sleeve bushings 33, which bushings 32 and 33 are normally seated within and axially straddle semicircular recesses or seats 34 formed in spaced relation within the upper interiorly flanged portions of the side walls of the lower casing section 25, and such bushings are maintained in seated relation within their respective recesses 34 by retaining caps 35 detachably secured, as by studs 36, or the like, to the interiorly flanged portions of said side walls, substantially in the manner shown in Fig. 2A.

Figure 4:
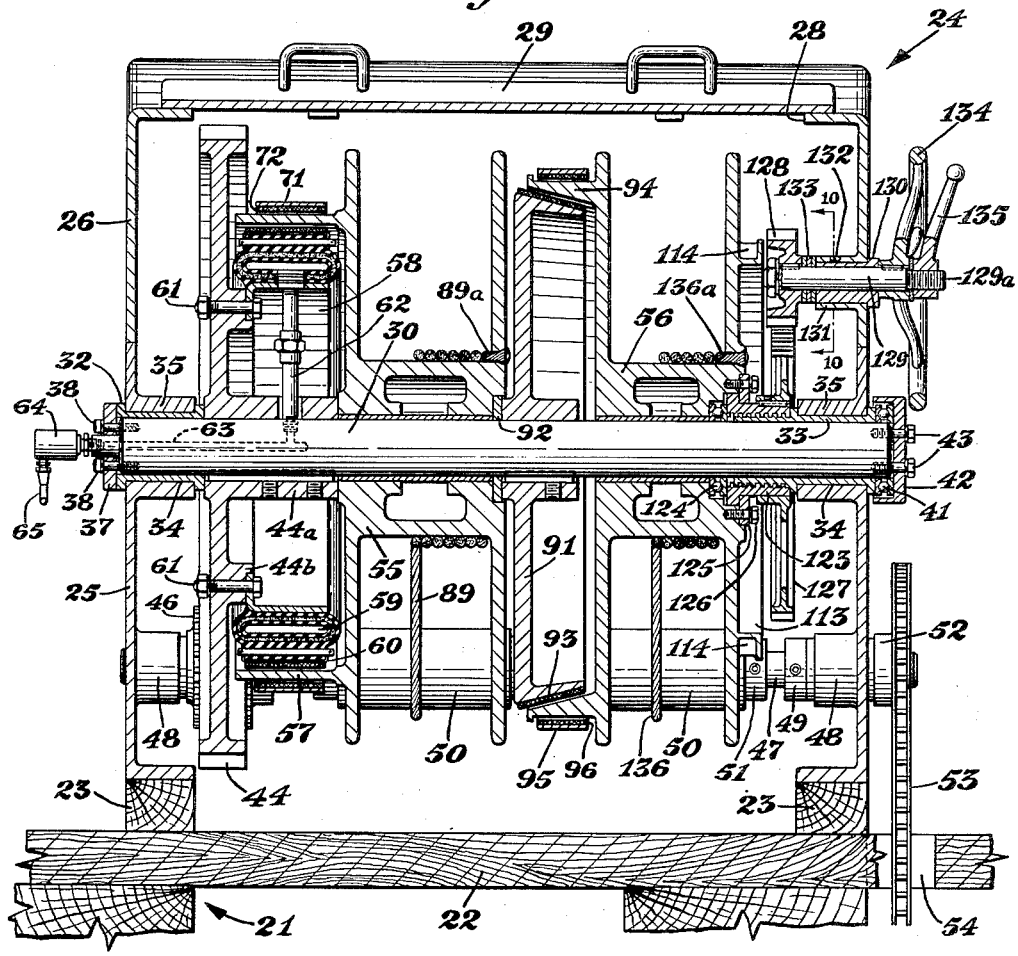
Fig. 4 is a transverse vertical section of the winch taken substantially on the staggered line 4—4 of Fig. 1, as it would appear when the seine tow and purse lines are outboard upon completion of a seine setting operation.

To positively prevent axial movement of the drum shafts 30 and 31 within their correlated bushings 32 and 33, or dislodgement of the same therefrom, the drum shaft 30 is provided at one end with a centrally perforated shaft retaining disk 37, which normally abuts the outer end or face of its associated bushing 32 and is detachably secured to the end of the shaft 30, as by sockethead cap screws 38, see Fig. 4, while, the similar end of the drum shaft 31 is provided with a shaft retaining disk 39, which normally abuts the outer end or face of its associated bushing 32 and is detachably secured to the end of the shaft 31, as by hexagon head cap screws 40, see Fig. 6. The other or opposite ends of the drum shafts 30 and 31 extend from their associated sleeve bushings 33 and substantially through anti-friction or flat thrust bearings 41, which are adapted to normally abut the outer ends or faces of their correlated sleeve bushings 33 and are housed within and in turn are abutted by shaft retaining caps 42 detachably secured, as by hexagon head cap screws 43 to the ends of their respective shafts 30 and 31, all as more clearly illustrated in Figs. 4 and 6.

The drum shafts 30 and 31 are drivably interconnected for rotation at the same speed in opposite directions by intermeshing spur gears 44 and 45, respectively, such gears being mounted upon their respective drum shafts 30 and 31 in abutting relation with the bushings 32 thereof and are keyed or otherwise fixedly secured in any suitable manner to their individual shafts.

Figure 3:
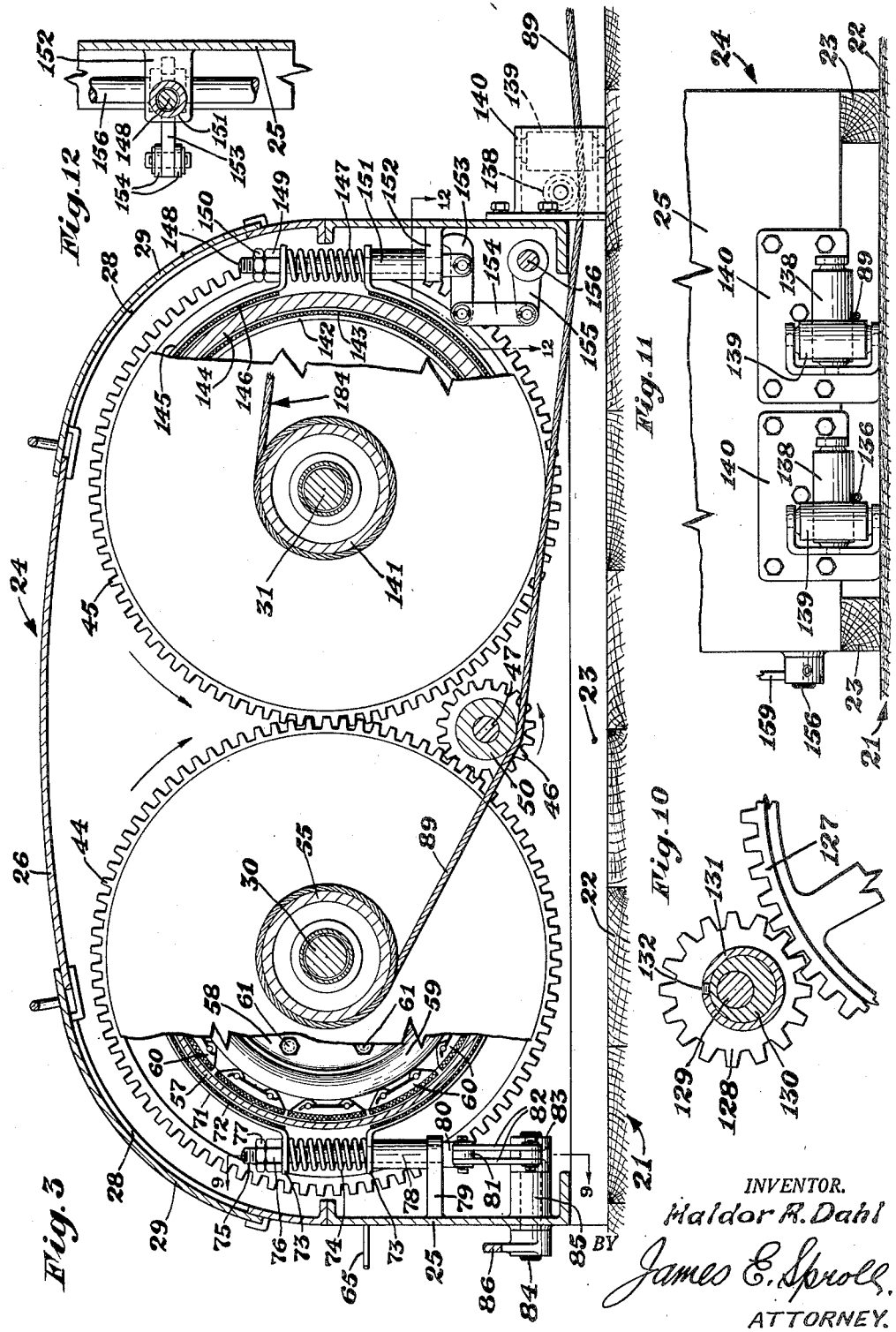
Fig. 3 is a longitudinal vertical section of the winch taken substantially on the line 3—3 of Fig. 2, as it would appear following a seine setting operation with the seine tow and purse lines unwound from their correlated drums, and with certain parts omitted and certain other parts broken away and shown in section for sake of clarity.

Rotation or driving torque is imparted to the spur gears 44 and 45 by a driving pinion 46, which normally meshes with the spur gear 44, see Fig. 3, and is keyed or otherwise fixedly secured to a driving shaft 47 transversely disposed within the lower portion of the lower casing section 25 and having its terminal portions journalled for rotation within inwardly extending bushed bosses 48 formed in axial alignment upon the inner surfaces of the side walls of said casing section, substantially midway the length of the latter, as shown in Figs. 3 and 5. Axial movement or dislodgment of the driving shaft 47 within or from its bushed bosses 48 is effectually prevented by the pinion 46 abutting the inner end or face of the adjacent bushed boss 48 and by a shaft retention collar 49 similarly abutting the other bushed boss 48, all as more clearly shown in Fig. 5.

Revolubly mounted for independent rotation upon the driving shaft 47 intermediate the pinion 46 and shaft retention collar 49 of the same are axially spaced guide rollers or sleeves 50, the function and purpose of which will hereinafter be made more apparent, however, it should be here stated that such rollers are positively maintained in a predetermined axially spaced relationship and against axial movement or dislodgment upon the shaft 47, as by roller retention collars 51, see Fig. 5.

The driving shaft 47, at the operator's side of the winch 24, extends from the casing section 25 to receive a sprocket wheel 52, which is keyed or otherwise fixedly secured thereto and is connected by a driving sprocket chain 53 to any suitable source of power, such as an electric motor or the like, not shown, but, which is preferably located below the deck 22 and in consequence the latter is provided with a rectangular opening 54 through which the sprocket chain 53 extends and passes downwardly for driving or operative connection with its source of power.

Revolubly mounted in axially spaced relation upon the drum shaft 30 is a bushed and peripherally flanged seine tow line drum 55 and an axially adjustable similarly bushed and flanged seine pursing drum 56, said tow line drum 55 being disposed adjacent the spur gear 44 with its centrally bossed outer end normally in abutment with the inner end or face of the elongated boss 44a integrally formed upon and extending inwardly from the inner side of said spur gear 44, while the axially adjustable seine pursing drum 56, with its associated clutch hereinafter described, is interposed between said tow line drum 55 and the inner end of the exteriorly threaded terminal portion of the sleeve bearing 33, all as shown more clearly in Fig. 4, and since the present invention contemplates individual operation and/or separate control of such drums 55 and 56, these drums are adapted to be drivably connected to the drum shaft 30 in the selective manner now to be described.

The tow line drum 55 is provided with an outwardly directed annulus or extension 57, which is concentrically and integrally formed upon the outer side and adjacent the perimeter of the outer peripheral flange of said tow line drum, to function as a drum for an internal clutch and as a drum for an external brake, hence, said annulus or extension 57 serves to house a fluid-distensible torque transmitting and cushioning rotary clutch structure 58 of the expanding type, which structure includes in part a fluid-distensible tire-like rubber member 59 having upon its outer expandable wall a series of clutching or friction shoes 60 adaptable for frictional engagement with the inner surface of the annulus 57. Since the type of fluid-distensible clutch structure 58 herein disclosed is well known in the industrial arts no further detailed description of the same is thought to be necessary, suffice it to say that no claim for novelty in such structure per se is made herein, the novelty and invention in the present instance being deemed to reside in the combination of such structure or its mechanical equivalent with the other clutch elements employed for establishing a driving connection between the drum shaft 30 and the tow line drum 55.

The clutch structure 58 is adapted to be carried by and seat upon an annular concentrically disposed centering boss 44b integrally formed upon the inner side of the spur gear 44 and to be detachably secured thereto, as by bolts 61. Fluid pressure is supplied to the distensible tire-like rubber member 59 of said clutch structure 58 through a radially disposed pipe 62 having communication at its inner end with an axial bore 63 formed within the adjacent end portion of the drum shaft 30, said bore at the projecting reduced terminal of the shaft 30 having a rotorseal 64 of well known type and construction threadedly secured within the outer end thereof, which rotorseal 64 is connected by a fluid pressure delivery pipe or tube 65 to the fluid pressure outlet of a variable-pressure or metering valve 66 of the well known "Flexair" type provided with an operating lever 67, said valve 66 having its fluid pressure inlet connected by a fluid pressure supply pipe or tube 68 to any suitable source of fluid pressure, not shown, and its fluid pressure exhaust outlet provided with a discharge pipe or tube 69.

Figure 1:
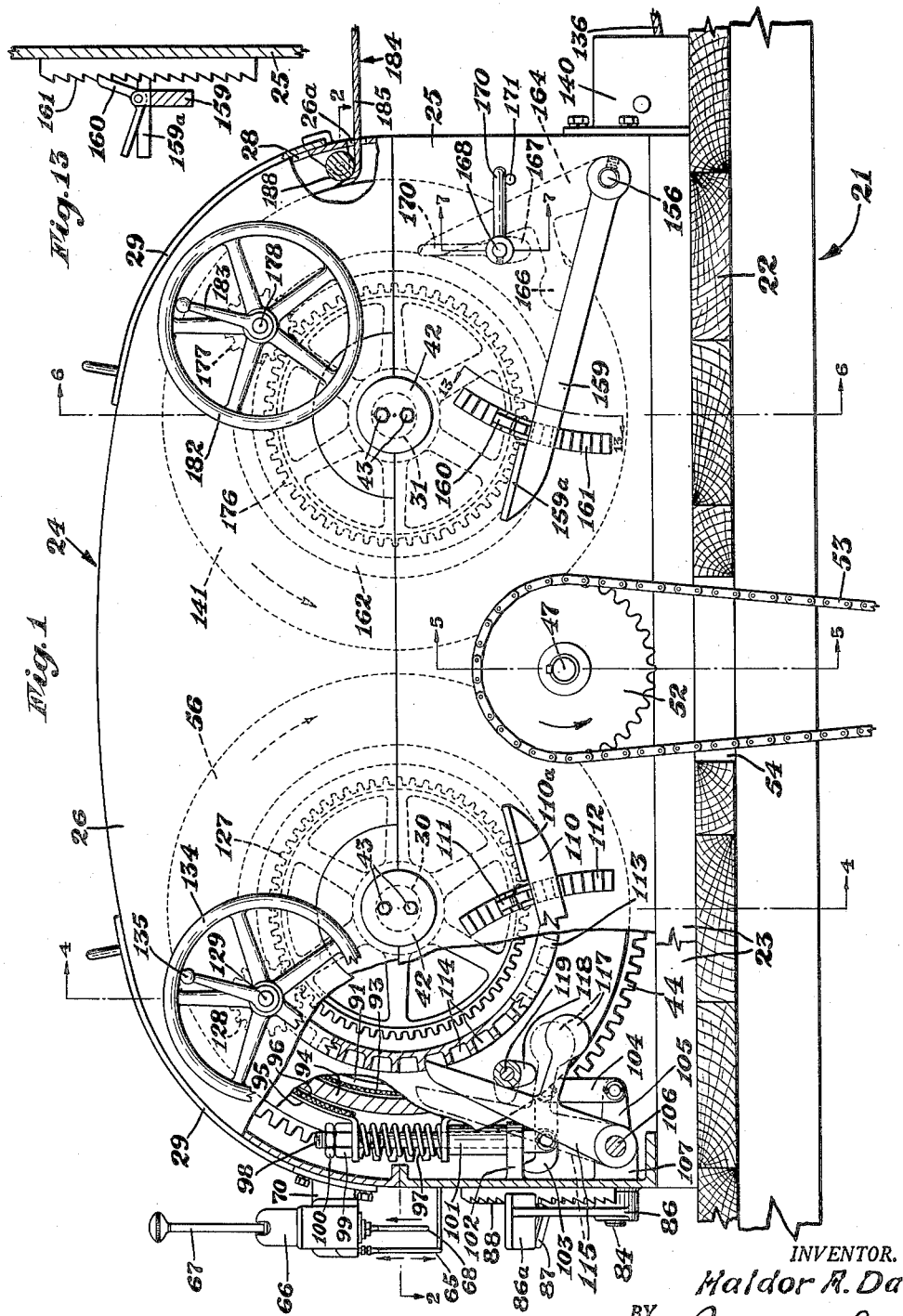
Figure 1 is a side elevation of the purse seine winch comprehended by the present invention, as it would appear when in readiness for a purse seine setting operation, and with certain parts broken away and certain other parts shown in section for clarity of illustration.

The variable-pressure valve 66 must of necessity be readily acessible and be within easy reach of the winch operator, accordingly, said valve is preferably located at the starboard end and on the operator's side of the winch 24 and in such location is carried by a mounting bracket 70, which is detachably secured to the cover or upper section 26 of the winch housing, see Figs. 1 and 3. The valve 66 functions in the present clutch structure to precisely and positively control the fluid pressure delivered to and exhausted from the distensible tire-like rubber member 59, whereby progressive distention and/or deflation of such member is effected to secure the desired variation in speed and degree of torque transmitted by the clutch structure 58 to the tow line drum 55, as will be readily manifest and apparent. Within the capacity limits of the clutch structure 58 any desired or selected speed or degree of torque may be obtained by movement of the valve operating lever 67 to the required position or setting, and in any specific setting of such lever the fluid pressure delivered to the distensible member 59 is automatically maintained by the valve 66, thus obviating the necessity of the winch operator continuously holding the lever 67 during tow line winding operations of the drum 55 and in consequence permitting release of said operator for other duties.

The external type of brake mechanism employed with the annulus 57 of the tow line drum 55 essentially consists of a brake band 71 adapted to substantially encircle said annulus and for braking or frictional engagement therewith is provided with a brake lining 72. The brake band 71 upon its outer side is provided with outwardly directed perforated terminal lugs 73, which are normally disposed in vertically aligned spaced relation and have a brake release spring 74 of the helical compression type interposed therebetween in alignment with the perforations thereof. Extending upwardly through the perforated lugs 73 and the spring 74 is a vertically disposed brake adjusting rod 75, the upper terminal portion of which is threaded to receive an adjusting nut 76 and a locknut 77, while, the lower end portion of said rod 75 extends downwardly through and is guided by a spacer sleeve 78 and the perforated inner end of a horizontal guide lug 79 carried by and projecting from the inner side of the end wall of the lower casing section 25, see Fig. 3, said rod 75 at its lower end being provided with a shouldered bifurcated terminal 80 adapted, when the brake band 71 is released, to normally abut the underside of the perforated end of the guide lug 79, see Figs. 3 and 5. Seated within and pivotally connected intermediate its length to the bifurcated terminal 80 is a lever 81 having an upturned semi-circular terminal at one end thereof adapted to abut and fulcrum upon the underside of the guide lug 79 and at the opposite end thereof is pivotally interconnected by links 82 to an arm 83 fixedly secured to the inner end of a brake pedal shaft 84 journalled within and extending through an integral or welded boss 85 carried by the end wall of the lower casing section 25, see Fig. 3, said shaft 84 upon its outer projecting end having a brake pedal 86 fixedly secured thereon to extend therefrom in spaced parallel relation to the adjacent end wall of said lower casing section, as shown more clearly in Fig. 2. Pivotally mounted upon the upper edge of the brake pedal 86 adjacent the foot plate 86a of same is a foot releasable dog 87 adapted for selective and restraining engagement with the teeth or serrations of an arcuate rack 88 welded or otherwise rigidly secured to the end wall of the lower casing section 25 in concentric relation to the pedal shaft 84, see Fig. 8.

The tow line drum 55 is adapted to receive for storage thereon a tow line or cable 89, which latter is wound or wrapped upon said drum in the customary and usual manner and at its inner end is adapted to be anchored to the drum in any suitable manner, as an example by employing the method indicated at 89a in Fig. 4. The tow line or cable 89 at its outer end is provided with a clevis or shackle 90, see schematic illustrations in Figs. 14 to 19, inclusive, this for the purpose of expediting and/or facilitating the attachment of such line or cable to the purse seine and the detachment of the same therefrom, as will hereinafter be made more apparent.

For effecting drivable connection between the drum shaft 36 and the axially adjustable or slidable seine pursing drum 56, a clutch structure of the cone type is preferably although not necessarily employed for such purpose. The cone clutch structure, as herein disclosed, essentially consists of a driving clutch member 91 mounted upon and keyed or otherwise fixedly secured to the drum shaft 36 in abutting relation with an annular thrust disk or washer 92 seated within the centrally recessed inner end of the tow line drum hub, as shown in Fig. 4. The clutch member 91, as now constructed, is concentrically recessed upon the pursing drum side of same and is provided with a frustro-conical periphery to which is secured in any well known manner a band or endless strip 93 of friction material, such as brake lining or the like. To complement and normally house the driving member 91 and thus complete the cone clutch structure for the seine pursing drum 56, said drum at its inner end is provided with an integral annulus 94 having a frustroconical interior adaptable for frictional engagement with the friction band 93 of the member 91 during operational periods of the drum 56 and also having a peripherally grooved exterior adapted to be frictionally engaged by a purse line drum brake now to be described.

The brake mechanism of the seine pursing drum 56 is similar in many respects to the tow line drum brake mechanism hereinbefore described, including as it does an annulus encircling brake band 95 having a brake lining 96 and a helical brake release spring 97 interposed between the spaced terminal or anchoring lugs of same, a brake adjusting rod 98 having a threaded upper end and a bifurcated and shouldered lower end, a brake adjusting nut 99 and a locknut 100 therefor both threadedly engaged upon the upper end of said rod 98, a spacer sleeve 101 and an inwardly extending perforated lug 102 carried by the end wall of the lower casing section 25 for guiding the lower end portion of said brake adjusting rod 98, a lever 103 seated within and pivotally connected intermediate its length to the bifurcated lower terminal of the brake adjusting rod 98 and having an upturned semicircular terminal normally abutting and fulcrumed upon the underside of the perforated lug 102 and at its opposite end is pivotally interconnected by links 104 to an arm 105 extending radially from and fixedly secured to a brake pedal shaft 106 adjacent the inner end thereof, said shaft being transversely disposed within the lower portion of the casing section 25 in spaced parallel relation to the adjacent end wall of same and is journalled at its inner end within an inwardly directed perforated ear 107 carried by said end wall and at its opposite end is journalled within and extends through a boss 108 interiorly formed upon the side wall of said casing section 25 and is positively retained against axial movement within said ear 107 and boss 108 by shaft retention collars 109 adapted to normally abut the opposing faces of said ear and boss. Rigidly secured to the outer terminal portion of the brake pedal shaft 106 projecting from the casing section 25 is a brake pedal 110, which extends from said shaft 106 in spaced parallel relation to the side wall of said casing section to a point within convenient and easy reach of the winch operator and at its free end and upon its upper edge is provided with a foot plate 110a. Pivotally mounted upon the upper edge of the brake pedal 110 adjacent the foot plate 110a is a foot actuated pedal locking dog 111 for selective and restraining engagement with the serrations or teeth of an arcuate rack 112 welded or otherwise fixedly secured to the side wall of the lower casing section 25 in concentric relation to the axis of the brake pedal shaft 106.

Concentrically and integrally formed upon the outer end of the seine pursing drum 56 is an annulus 113 having a series of uniformly spaced circumferential notches or pockets 114 formed therein for interlocking engagement with the notch engaging upper terminal of a drum locking dog 115 mounted at its lower end for free pivoting movement upon the brake pedal shaft 106 and maintained against axial movement thereon and in transversely aligned relation with the circumferential notches 114 by dog retention collars 116 rigidly secured to said shaft. The drum locking dog 115 upon its inner edge and substantially midway its length is provided with a counterweight 117 to compensate for the rolling of the purse seiner 21 and to also positively preclude accidental release of same due to such rolling or for any other reason, said counterweight 117 being formed either integrally with the dog 115 or fixedly secured thereto in any suitable manner. As will be apparent from the foregoing, the principal function of the dog 115 is to prevent reverse rotation of the seine pursing drum 56, especially and more particularly during seine pursing operations, however, following the latter it is essential and necessary, for a purpose and reason hereinafter described in the operational description of the purse seine winch 24 and in the carrying out of the present method of purse seining, to effect reverse rotation of the seine pursing drum 56, accordingly, a partially rotatable dog releasing cam 118, of substantially elliptical formation, is provided to effect disengagement or release of the dog 115 from the engaged notch of the annulus 113, which cam, in the present instance, is adapted to normally bear against the inner edge of the dog 115 at a point thereon above the counterweight 117 of same and when partially rotated moves said dog 115 outwardly to its inactive or released position indicated by dot and dash lines in Fig. 1. In the operative mounting of the dog releasing cam, as now contemplated, such cam is rigidly secured to the inner end of a stub shaft 119 journalled within and extending through an elongated boss 120 formed interiorly upon the side wall of the lower casing section 25, see Fig. 7, and similarly secured to the outer end of the stub shaft 119, exteriorly of said casing section, is a manually operable lever 121 for imparting partial rotation to such shaft and its correlated cam 118 when the dog 115 is to be released. When the cam 118 is in its inactive vertically disposed position shown in Fig. 1, the manually operable lever 121 is disposed in a substantially horizontal position and is adapted, at such time, to rest upon a limit or stop stud 122 projecting perpendicularly from the outer face of the side wall of the lower casing section 25, as shown in Fig. 8, in passing it should be here noted, that activation of the cam 118 to effect release of the dog 115 requires approximately ninety degrees of movement of the lever 121, as indicated by the dot and dash line position of the cam 118 in Fig. 1.

Axial adjustment or sliding movement of the seine pursing drum 56 upon the drum shaft 30 to effect clutching and declutching of said drum with the driving clutch member 91 is accomplished by the mechanism now to be described. Threadedly mounted for axial adjustment upon the exteriorly threaded inner end portion of the sleeve bushing 33 is a sleeve nut 123 having its peripherally shouldered inner end in normal abutment with an anti-friction or flat thrust bearing 124 concentrically seated within the outer end portion of the drum hub, which is centrally recessed and progressively stepped in the manner shown in Fig. 4 to receive and accommodate the thrust bearing 124, the peripherally shouldered inner sleeve end of the sleeve nut 123 and an annular nut retention plate 125, which latter is rigidly secured in seated relation within its companion drum recess by hexagon head cap screws 126 and thereby positively maintains the sleeve nut 123 in abutment with the thrust bearing 124, as will be manifest and apparent by referring to Fig. 4.

Mounted upon the keyed or otherwise fixedly secured to the outer end portion of the sleeve nut 123 is a spur gear 127 having intermeshing and sliding engagement with a spur gear pinion 128 mounted upon and similarly secured to the inner end portion of a pinion shaft 129 journalled for rotation within a circumferentially adjustable eccentric sleeve 130 seated within a boss 131 interiorly formed upon the side wall of the cover section 26 of the winch casing and having a peripherally shouldered outer end adapted to normally abut the exterior face of said side wall. The eccentric sleeve 130 functions in the present mechanism to effect adjustment of the distance between the centers of the spur gear 127 and spur pinion 128 whereby the pitch lines of same are brought into coincidence, as will be readily understood by referring to Fig. 10, and when thus adjusted such sleeve is locked within the boss 131 by a headless set screw 132. Interposed between the spur gear pinion 128 and the inner end of the eccentric sleeve 130 is a series of shims or washers 133 for providing fractional longitudinal adjustment of said pinion relative to the spur gear 127. Slidingly keyed or splined upon the pinion shaft 129 adjacent the outer end thereof is an operating handwheel 134 for the drum adjusting mechanism, said handwheel having its centrally bossed portion normally in abutment with the outer end of the eccentric sleeve 130 and threadedly engaged upon the shouldered and threaded outer terminal portion 129a of said shaft 129 is a clamping lever 135 adapted to rigidly clamp the handwheel 134 to the eccentric sleeve 130 when the purse line drum 56 is in either its clutch or declutched positions.

The mode of operation of the drum axially adjusting mechanism is thought to be obvious upon inspection, however, in order to make same entirely clear a brief description of such operation is here given. Assuming the drum 56 to be in its declutched position shown in Fig. 4, to effect clutching or frictional engagement of the same with the driving clutch member 91 and thus establish a driving connection between said drum 56 and the drum shaft 30, the lever 135 is unclamped and the hand-wheel 134 rotated in a clockwise direction to cause rotation of the spur gear pinion 128, which in turn imparts rotation to the spur gear 127 and its correlated sleeve nut 123 thereby causing the latter to travel inwardly upon the exteriorly threaded inner portion of the sleeve bushing 33 and coincidentally therewith sliding the drum 56 inwardly upon the drum shaft 30 until clutching engagement between the drum annulus 94 and the friction band 93 of the member 91 is effected, following which the lever 135 is reclamped upon the handwheel 134. Declutching of the drum 56 is accomplished by unclamping the lever 135 and rotating the handwheel 134 in a counter-clockwise direction which causes reversal of movement and rotation of the parts above described and upon completion of the declutching operation the lever 135 is again clamped to the handwheel 134.

The seine pursing drum 56, during seine pursing operations, is adapted to receive and accommodate, in a manner hereinafter more fully set forth, a portion or section of the sectional or two-part purse line or cable employed with the purse seine or net of the purse seiner 21, and to facilitate and expedite the winding of such purse line portion or section upon said drum 56, the latter is provided with a relatively short pilot cable or line 136 which is anchored at its inner terminal to the drum 56, substantially as shown at 136a in Fig. 4, or in any other suitable or desired manner, and at its opposite or outer terminal is provided with a clevis or shackle 137, the function and purpose of which will shortly be fully explained. For obvious reasons the pilot cable 136 never becomes completely unwound from the drum 56 during normal purse seining operations of the purse seine winch 24, inasmuch as, it is the duty of the winch operator to exercise proper care to maintain and retain, at all times, several anchoring wraps of such cable 136 upon said drum 56.

Figure 2:
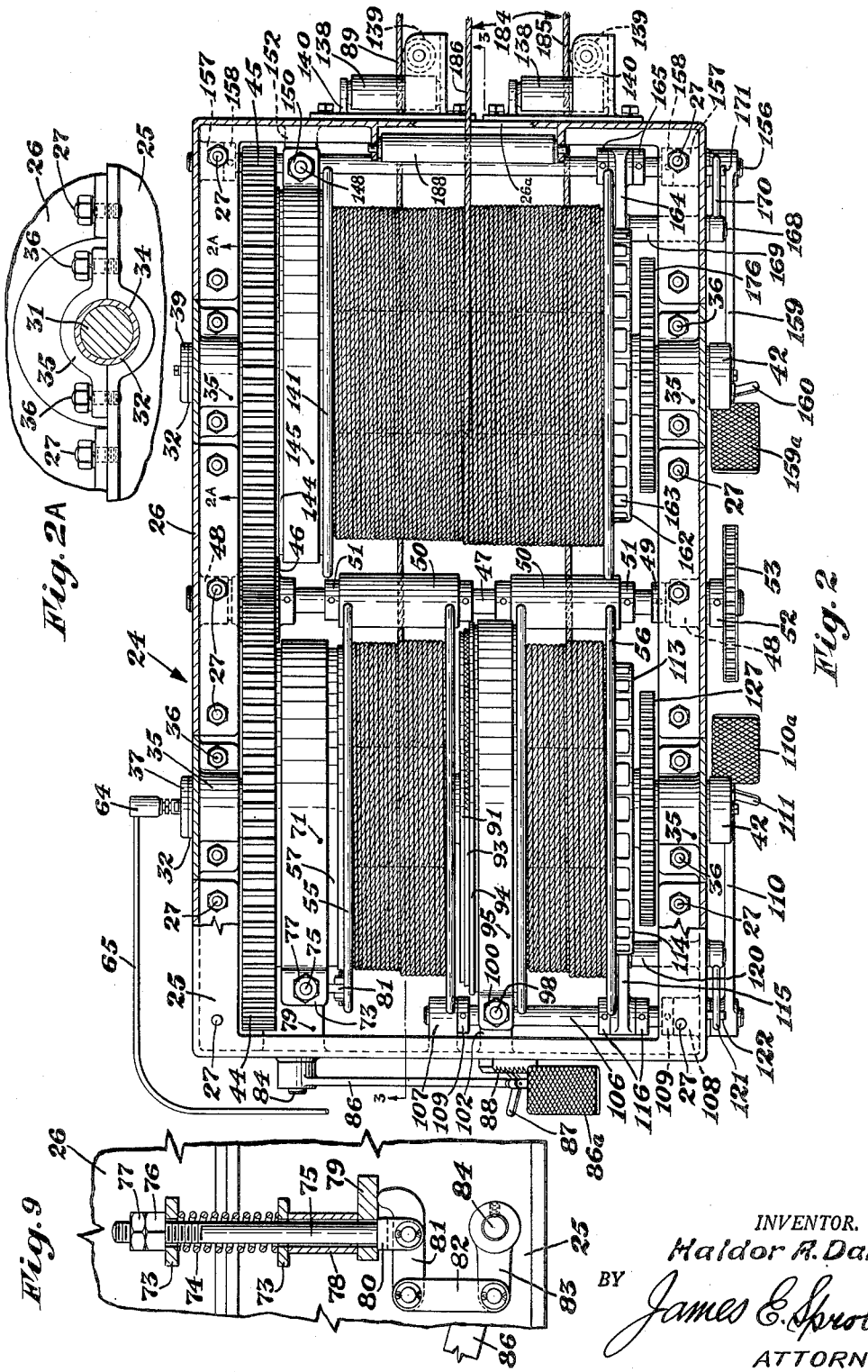
Fig. 2 is a horizontal section of the winch taken substantially on the line 2—2 of Fig. 1, as it would appear following a purse seining operation with the seine tow and purse lines stored therein.

In the present purse seine winch 24, as now contemplated, the tow line or cable 89 and the pilot cable or line 136 are wound upon their drums 55 and 56, respectively, at the undersides of same and when unwound therefrom pass under their respective guide rollers 59, and from thence pass between the purse seiner deck 22 and the flanged lower edge of the end wall of the lower casing section 25 at the port or seine operational end of the winch 24, substantially in the manner more clearly shown in Fig. 3, and exteriorly of said casing section 25 such tow line 89 and pilot cable 136 pass under horizontally disposed guide rollers 138 and tangentially contact the peripheries of vertically disposed guide rollers 139, which rollers are rotatably mounted in juxtaposition upon brackets 140 detachably secured in spaced relation upon the outer face of the casing section end wall, see Figs. 1, 2, 3 and more particularly Fig. 11.

Revolubly mounted for axial adjustment and/or sliding movement upon the drum shaft 31 is an elongated bushed and peripherally flanged seine pursing and purse line storage drum 141 adapted to be drivably connected to said shaft 31 by a cone type clutch structure fabricated in the manner now to be described.

Integrally formed upon the inner side of the spur gear 45 of the shaft 31 is a driving annulus 142 provided with a frustro-conical periphery to which is fixedly secured in any desired manner a band or endless strip 143 of friction material, such as brake lining or the like. For housing the annulus 142 therein and complementing the same to form the drum cone clutch structure an integral annulus 144 is formed and provided upon the adjacent end or face of the pursing and storage drum 141, see Fig. 6, said last mentioned annulus 144 having a frustro-conical interior wall adaptable for frictional engagement with the friction band 143 of the driving annulus 142 during operational periods of the drum 141 and also having a peripherally grooved exterior face adapted to be frictionally engaged by a pursing and storage drum brake, which is substantially identical to, but is of slightly heavier construction than, the brake structure of the seine pursing drum 56 previously described.

The brake structure of the pursing and storage drum 141 is provided with a brake band 145 adapted to substantially encircle the peripherally grooved annulus 144, see Fig. 3, said brake band having a brake lining 146 and a helical brake release spring 147 interposed between the spaced terminal or anchoring lugs of same, and in addition thereto a brake adjusting rod 148 having a threaded upper end portion and a bifurcated and shouldered lower terminal, a brake adjusting nut 149 and a locknut 150 therefor both threadedly engaged upon the threaded upper end portion of said rod 148, a spacer sleeve 151 and a perforated lug 152 extending inwardly from the adjacent end wall of the lower casing section 25 to function conjointly with the spacer sleeve 151 as a guide for the lower end portion of the brake adjusting rod 148, a lever 153 seated within and pivotally connected intermediate its length to the bifurcated lower terminal of said rod 148 and having an upturned semi-circular terminal normally abutting and fulcrumed upon the underside of the lug 152 and at its opposite end is pivotally interconnected by depending links 154 to an arm 155 extending radially from and rigidly secured to a brake pedal shaft 156 adjacent one end thereof, which shaft is transversely disposed within the lower or corner portion of the cable pay out end of the lower casing section 25 in spaced parallel relation to the adjacent end wall of same and is journalled at its ends within bosses 157 interiorly formed in axially aligned relation upon the side walls of said casing section 25 and is positively retained against axial movement in or dislodgment from said bosses by boss abutting shaft retention collars 158. The brake pedal shaft 156, at the winch operator's side of the lower casing section 25, extends through and projects from the boss 157 located at such side and is provided upon its projecting terminal portion with a brake pedal 159, which is rigidly secured to said shaft and extends therefrom in spaced parallel relation to the adjacent side wall of the casing section 25 to a point within easy and convenient reach of the winch operator and at its outer free end is provided with a foot plate 159a. Pivotally mounted upon the upper edge of the brake pedal 159 adjacent the foot plate 159a thereof is a foot actuated pedal locking dog or pawl 160 for selective and restraining engagement with the serrations or teeth of an arcuate rack 161 rigidly secured to the side wall of the casing section 25 in concentric relation to the axis of the brake pedal shaft 156, see Fig. 1.

In the present disclosure, I have shown and described the brake mechanisms of the tow seine pursing and storage drums 55, 56, and 141, as equipped with lined brake bands, however, I desire to have it understood that the purse seine winches of the invention are furnished to the fishing industry with either lined or unlined brakes according to the desires and wishes of the customers. In winches equipped with unlined brake bands, the latter provide metal to metal contact with their respective brake drums and when in use these brake bands are periodically given a relatively light coating of grease to assure smooth operation and to obviate or prevent seizing of the brake bands upon their correlated brake drums.

For the same functions and purposes as those hereinbefore described for the seine pursing drum 56, elongated seine pursing and purse line storage drum 141 is provided with corresponding and similar parts now to be described. Integrally formed upon the end of the drum 141 opposite to that of its cone clutch is a concentrically disposed annulus 162 having a series of uniformly spaced circumferential notches 163 restrainingly engageable by a drum locking dog 164 mounted for free pivoting movement upon the brake pedal shaft 156 and positively maintained against axial movement thereon and in aligned relation with the notches 163 by retention collars 165. The drum locking dog 164 upon its inner edge is provided with a counterweight 166 and is also abutted on said inner edge by a dog releasing cam 167 carried by a stub shaft 168 journalled within an elongated boss 169 interiorly formed upon the side wall of the lower casing section 25, and upon its projecting outer end is provided with an operating lever 170 adapted when inactive to rest upon a fixed stud 171 carried upon said side wall.

Also for the same function and purpose the axially adjustable elongated pursing and storage drum 141 is provided with a drum axially adjusting mechanism which corresponds to and is substantially a duplicate of that previously described for the axially adjustable seine pursing drum 56, but, which in the following description thereof, the individual parts of same are preferably given different reference characters for sake of clarity and simplicity of the operational description of the purse seine winch 24 hereinafter set forth.

In the axially adjusting mechanism of the drum 141, the numeral 172 denotes an axially adjustable sleeve nut carried by the threaded sleeve bushing 33 of the drum shaft 31 for normal abutment at its peripherally shouldered inner end with a thrust bearing 173 concentrically seated within the centrally recessed end of the drum hub, which is progressively stepped to accommodate and receive the bearing 173, the peripherally shouldered inner end of the sleeve nut 172 and an annular nut retaining plate 174 rigidly secured, as by cap screws 175, to the end of the drum 141, see Fig. 6. Carried by and rigidly secured to the sleeve bushing 33 of the drum shaft 31 is a spur gear 176 having intermeshing and sliding engagement with a spur gear pinion 177 rigidly secured to the inner end of a pinion shaft 178 journalled within a circumferentially adjustable and exteriorly shouldered sleeve 179 seated and adapted to be rigidly secured in any selected adjusted position within a boss 180 interiorly provided upon the side wall of the cover section 26 and interposed between the pinion 177 and the sleeve 179 is a series of shims 181 for effecting longitudinal adjustment of said pinion relative to the spur gear 176. An operating handwheel for the axial adjusting mechanism of the drum 141 is splined to the outer end of the pinion shaft 178 and is adapted to be clamped to the sleeve 179 by a clamping lever 183 when the drum 141 is in either a clutched or declutched position.

The elongated seine pursing and purse line storage drum 141 is adapted to receive and accommodate for storage thereon, following purse seining operations, the entire sectional or two-part purse line or cable employed with the net or purse seine of the purse seiner 21, which purse line is herein generally designated by the numeral 184 and essentially consists of a detachable outer section 185 and an inner anchored section 186, which sections are normally and releasably interconnected, as by a "figure eight" coupling 187, see Figs. 15 and 16, to thus facilitate purse seining operations, as will hereinafter be made more obvious and apparent. The purse line 184 is wound or wrapped upon the drum 141 in a conventional manner and at the inner terminal of the inner section 186 thereof is anchored to the drum 141, substantially in the manner indicated at 184a in Fig. 6, or in any other suitable or desired fashion. The purse line or cable 184 is wound upon the drum 141 at the upper side of same and when unwound therefrom passes under a guide roller 188 interiorly mounted upon the end wall of the cover section 26 and from thence passes through a transversely disposed slot 26a formed in said end wall, see Figs. 1 and 2. The outer terminal of the purse line outer section 185 is provided with a clevis or shackle 185a, whereby such section may be releasably connected to the clevis 137 of the pilot cable or line 136 for and during seine pursing operations. In the instant disclosure I have elected to show and describe the cover section 26 as provided with the transversely disposed slot 26a and a guide roller 188 for leading the purse line 184 into and out of the winch casing, however, it is to be here understood, that such slot and roller may be dispensed with, if and when desired, and the adjacent rectangular inspection opening 28 utilized, during purse seining operations, for such purpose upon removal of the demountable inspection cover 29 of same.

In Figs. 14 to 19, inclusive, the numeral 189 designates the net or seine of the purse seiner 21, said net having the usual floats 190, bridles 191, bridle rings 192 and end guide rings 193 at the lower corners of the net, through which bridle and guide rings the sectional or two-part purse line 184 normally extends in the manner shown more clearly in Figs. 15 and 16, said purse line being threaded or passed through such bridle and guide rings prior to each purse seining operation and withdrawn therefrom subsequent thereto, all in a manner hereinafter more fully explained in the description of the purse seining operation. The net or purse seine 189 is also provided at the ends and upper corners thereof with the usual loops or rings 194 and 194a, respectively, for net anchoring and towing purposes, as shown in Fig. 15, and for net anchoring purposes, as shown in Fig. 16.

To effectively guide the tow line or cable 89 as it passes outboard and inboard during seine setting and towing operations a guide sheave 195 is provided therefor, see Figs. 14 and 15, and to similarly guide the sectional or two-part purse line or cable 184 as it passes outboard and inboard during seine setting, towing and pursing operations guide sheaves 196 and 197, respectively, are provided therefor, see Figs. 15 and 16 more particularly. In the present disclosure the sheaves 195 to 197, inclusive, have for sake of illustrative clarity been shown diagrammatically and with no specific type of mounting shown, however, it is to be here understood that such sheaves in actual practice and use may be individually carried by three single open-sided davit blocks, or may be carried by one single open-sided davit block and one double open-sided davit block, or in any other suitable or desired manner, the foregoing being merely suggestive of tow and purse line guide means and a method of operatively mounting the same. Anchor hooks 198 and 198a, which are also diagrammatically illustrated, are adapted to receive the loops or rings 194 and 194a on the ends and at the upper corners of the seine or net 189 for anchoring the latter thereto particularly during seine pursing operations, as shown in Fig. 16, said hooks 198 and 198a being located in spaced relation at any convenient points on the purse seiner 21, as for example, such hooks may be carried by and rigidly secured in any suitable manner to the purse davit of said purse seiner. When not in use the net or purse seine 189 is adapted to be folded and stored, in a manner shortly to be described, upon the turntable 199 of the purse seiner 21. The numeral 200 designates the fish hatch of the purse seiner 21 and the numeral 201 the operating skiff customarily carried by the latter, the function of which will be more fully brought out in the operational description of the invention.

In the operation of the purse seine winch 24 and in the carrying out of the novel method of purse seining evolved by the present invention, assuming the purse seiner 21 is on the way to the fishing grounds the crew at such time is engaged in preparing the net or purse seine 189 for the initial purse seining operation, such preparation being carried out in the following manner. The winch operator takes his station at the controls of the winch 24 and releases such controls progressively to first permit a sufficient amount or length of the tow line 89 to be unwound or withdrawn from the tow line drum 55, so that said tow line may be passed over the guide sheave 198 and the tow line clevis 90 be releasably connected to the eye or loop 194a of the purse seine 189, as shown in Fig. 14. The winch operator next releases the drum locking dog 164 of the seine pursing and purse line storage drum 141 to permit reverse rotation of the same and coincidentally therewith unwinding or withdrawal of the outer section 185 of the purse line 184 therefrom, which section 185 is then passed over the purse line guide sheave 197 and from thence is passed, in a manner hereinafter described in more detail, through the guide rings 193 and the bridle rings 192, following which the clevis 185a of the purse line section 185 is releasably connected to the loop or ring 194 of the purse seine 189, as shown in Fig. 14.

Upon arrival at the fishing grounds and when a school of fish has been located, the operating skiff 201 is launched or put overboard followed by the skiff operator taking his station aboard same in an obvious manner, after which the skiff operator assisted by a member of the crew releasably secures the skiff 201 by a skiff tow line 201a to a cleat 202, or other fixed member on the purse seiner 21, following which the skiff operator then releasably secures or lashes the skiff painter 201b to the loop or ring 194 of the purse seine 189 and then stands by for the net setting and towing step of the purse seining operation.

In carrying out the net setting and towing step of the purse seine operation, the purse seiner 21 is first maneuvered with the operating skiff 201 in tow, into the most advantageous position for setting the net, and when in such a position the skiff tow line 201a is cast off or released, whereupon the purse seiner 21 proceeds on a substantially circular pre-selected course to effect setting of the net 189 and the surrounding of the school of fish leaving the operating skiff 201 in a substantially stationary position, all in a manner now to be described. Before continuing with the detailed description of the net setting and towing step of the purse seining operation, it should be here stated that the pre-selected course taken by the purse seiner during said net setting and towing step is determined by the kind of fish to be caught, as for example, if fishing for tuna or sardines, then and in that event, the purse seiner 21 takes a course in a counter-clockwise direction, as indicated by the full line arrow in Fig. 14, however, if fishing for herring the purse seiner 21 takes a course in a clockwise direction, as indicated by the dotted line arrow in Fig. 14. In the latter instance, this fact should be carefully noted, that the purse seine winch and purse seining method employed for herring seining is opposite hand to the winch and method employed for tuna and sardine seining, stated otherwise, for herring seining the purse and tow line lead-offs are on the starboard side of the purse seiner and the entire seining operation is conducted on said starboard side, while, for tuna and sardine seining the purse and tow line lead-offs are on the port side of the purse seiner and the entire seining operation is conducted on such side. For the purpose of disclosing the present invention I have elected herein to show and describe the same as it relates to seining for tuna and sardines, it being here clearly understood that the said invention contemplates the use of either right-hand or left-hand purse seine winches. Resuming the detailed description of the net setting and towing step of the purse seine operation, it should be stated that during such net setting and towing step the operator of the skiff 201 maintains the same substantially on station, so that the end of the net 189 which is releasably anchored to the skiff 201 by the painter 201b remains for all practical purposes essentially stationary and as the purse seiner 21 moves away from the skiff 201 upon its approximately circular net setting course, the net or purse seine 189 is automatically and progressively pulled off the turntable 199 and payed out over the purse seiner stern. When the net or purse seine 189 has been completely payed out the purse seiner 21 returns to the stationary end of said net and while so returning a sufficient amount of the tow line 89 is payed out, under the control of the winch operator, to effect closing of the seine circle. Upon return of the purse seiner 21 to the stationary end of the net 189 and the skiff 201, the skiff operator detaches the skiff painter 201b from the loop 194 of said net and anchors or hooks such loop to the anchor hook 198 of the purse seiner 21, as shown in Fig. 15. As a preliminary to the seine pursing step of the purse seining operation, the skiff operator aided by a member of the crew next releasably connects the terminal clevis 185a of the outer purse line section 185 to the corresponding clevis 137 of the purse line pilot cable 136, which latter prior to its being connected to the purse line section 185 is passed over the purse line guide sheave 196 by said crew member, see Fig. 15. After completion of the above, the skiff and its operator is free to perform other and additional duties during the balance of the purse seining operation, such as encircling and inspecting the net 189 during the closing and pursing of the same; to also effect bunching of the net floats 190 to thereby maintain the sides or walls of the net substantially perpendicular in the water while the net is being closed and pursed and at the same time prevent escape of any fish over the top edge of the net, and finally, intermediate the net pursing and fish brailing steps of the purse seining operation, to secure or tie the skiff 201 to the float line of the net 189, at a point thereon remotest from the purse seiner 21, see Fig. 18, this in order to utilize the skiff 201 at such point to provide compensating and substitute buoyancy for that lost when the net floats 190 are progressively taken inboard during the fish brailing step, as and in the manner hereinafter made more apparent. While the net or seine 189 is being set as above set forth, the winch operator is engaged in starting the purse seine winch motor, not shown, to impart driving torque to the winch driving shaft 47, which latter in turn imparts rotation to the drum shafts 30 and 31 through the pinion 46 and the spur gears 44 and 45 in an obvious manner. The drum shafts 30 and 31, at this time, rotate idly within their correlated drums 55, 56 and 141, such drums remaining idle until after the outer purse line section 185 has been releasably connected to the pilot cable 136, as hereinbefore described, however, following such connection and to complete the net setting and towing step of the purse seining operation, the winch operator drivably connects the tow line drum 55 with its shaft 30 by manipulating the fluid pressure control valve 66 to activate the fluid-distensible clutch of said drum and he also similarly connects the purse line drum 141 with its shaft 131 by rotating the handwheel 182 in a counter-clockwise direction to activate the friction clutch of said last mentioned drum and at the same time throws the counter-weighted drum locking dog 164, which had been previously disengaged for the net setting operation, into re-engagement with its notched drum annulus 162, to thus haul in the tow line 89 and take up the slack of the inner purse line section 186 by rewinding the same on their respective drums 55 and 141 and in so doing effect closing of the net or seine 189 by bringing the towed end of the latter along side of the purse seiner 21. When the towed end of the net has thus been brought along side, the winch operator manipulates the valve 66 to disengage the fluid-distensible clutch of the tow line drum 55 and rotates the handwheel 182 in a clockwise direction to disengage the friction clutch of the purse line drum 141 and upon effecting disengagement of said clutches applies the brakes of such drums to arrest rotation of same, following which another crew member anchors or hooks the loop 194a of the net 189 over the anchor hook 198a, see Fig. 16, and then detaches the tow line clevis 90 from said loop 194a, whereupon the winch operator releases the brake of the tow line drum 55 and reactivates the latter, as heretofore described, to rewind the terminal portion of the tow line 89 upon its drum, after which the winch operator deactivates the latter and applies the drum brake, the foregoing completes the work of the tow line drum 55 and the same is out of service for the remainder of the purse seining operation now being described.

In carrying out the net pursing step of the purse seining operation, the winch operator releases the brakes of the purse line drums 56 and 141 and activates the friction clutches of same to drivably connect such drums to their respective drum shafts 30 and 31, by rotating the clutch operating handwheel 134 in a clockwise direction and the clutch operating handwheel 182 in a counterclockwise direction, so that the outer purse line section 185 is wound upon the drum 56 and the inner purse line section 186 is rewound upon the drum 141 simultaneously, to maintain the proper shape of the net as it is being pursed, care being exercised and observed by the winch operator, at this time, in manipulating the brake and clutch controls of the drums 56 and 141 to thus positively insure that an equal and uniform tangential pull is exerted on both purse line sections 185 and 186 so that the net 189 is symmetrically pursed, substantially as shown in Figs. 16. When the net 189 has been completely pursed, as shown in Fig. 17, the purse line drums 56 and 141 continue to rotate to wind in the purse line sections 185 and 186, so that the bridle rings 192 are hoisted from the water and are brought along side of the purse seiner 21 in a substantially vertical position and within easy reach of a crew member, whose duty it is to pass a cable strap 203, shown in Fig. 18, through the bridle rings 192 and thereafter snugly secure the looped terminals of said cable strap to the boom hoisting tackle 204, shown in Fig. 19, the weight of the net 189 and its fish catch, meanwhile being carried or supported by the purse line sections 185 and 186, the winding in of said sections having been temporarily halted in an obvious manner after the hoisting of the bridle rings 192 to their substantially vertical position and before the cable strap 203 is passed throught said rings. After the looped ends of the cable strap 203 have been snugly secured to the boom hoisting tackle 204, the bridle rings 192 are hoisted inboard by said cable strap and tackle, thus relieving the purse line sections 185 and 186 of the load, and as the bridle rings are being brought inboard, such purse line sections are automatically released or lifted out of their open-sided purse blocks carrying the purse line sheaves 196 and 197. When the bridle rings have been brought inboard, the hoisting tackle 204 is slackened off and the bridle rings together with the interconnected end portions of the purse line sections 185 and 186 and the cable strap 203 are allowed to drop on the purse seiner deck 22, after which the bridle rings 192 are assembled in groups, which latter are individually and temporarily lashed to eyebolts, cleats, or the like, on the opposite or starboard side of the purse seiner 21, this in order to forestall any possibility of the rings 192 being jerked overboard, either by the rolling of the purse seiner in rough weather, or by the action and weight of the fish in the net. After the bridle rings 192 have been secured, as above described, one end of the cable strap 203 is detached from the hoisting tackle 204 and as the latter is hoisted away said cable strap is automatically withdrawn from the bridle rings 192, following which the "figure eight" coupling 187 is disconnected from either the purse line section 185 or the purse line section 186, to permit said purse line sections being manually withdrawn from the bridle rings 192. At any convenient time, prior to the preparation for the succeeding purse seining operation or for returning of the purse seiner to port, the purse line sections 185 and 186 previously withdrawn from the bridle rings 192 are again coupled together by the "figure eight" coupling 187, so that the outer purse line section 185 wound upon the pursing drum 56 during the pursing step of the previous purse seining operation may be unwound therefrom and rewound upon the pursing and purse line storage drum 141 in the manner now to be described. The winch operator releases the friction brake of the pursing drum 56 and disengages the drum locking dog 115 of the same to free said drum for reverse rotation and the unwinding of the outer purse line section 185 therefrom, which latter is then passed around either of the sheaves 196 or 197 and is again coupled or connected by a member of the crew to the inner purse line section 186, following which the winch operator releases the brake of the drum 141 and engages the clutch of the latter to drivably connect the same with its shaft 31 by rotating the clutch handwheel 132 in a counter-clockwise direction, to thereby effect rewinding of the outer purse line section 185 upon the storage drum 141, as will be readily understood. After the section 185 has been rewound upon the drum 141, the winch operator rotates the handwheel 132 in a clockwise direction to disengage the clutch of said drum and immediately applies the brake of such drum to arrest rotation of same, at which time the crew member above mentioned detaches the clevis 185a of the outer purse line section 185 from the clevis 137 of the pilot cable 136. Upon completion of the foregoing all of the winch drums are out of service until required for the next or succeeding purse seining operation.

In carrying out the final or fish brailing step of the purse seining operation now being described, the fish are brailed or removed from the pursed net 189 in a conventional and well known manner, and as the fish are brailed from the net they are delivered directly to the fish hatch 200 and as the brailing step proceeds the net 189 is periodically and progressively constricted and brought inboard and at such time the bridle rings 192, attached by the bridles 191 to the portions of the net brought inboard, are also progressively detached or unlashed from their temporary anchoring points, as and when the load and/or strain on their portions of the net has been relieved or taken off. As the net 189 is brought inboard, as above described, it is neatly stowed or piled in an orderly fashion upon the seiner turntable 199 in folded or lapped formation and in consecutive and transversely disposed piles, as shown in Fig. 18, with the net floats 190 on the port side and the net bridle rings 192 on the starboard side. To expedite bringing the net 189 inboard and the stowage of same on the turntable 199 during the fish brailing step, such turntable is preferably, although not necessarily, disposed at an angle, or in other words is disposed substantially in alignment with the path of the net as it is being hauled inboard, see Figs. 16 and 18. When the net 189 has been completely constricted and all fish has been removed therefrom, that portion of the net remaining outboard is hauled in and stowed on the turntable 199, which latter is then slued around to its normal position, with the floats 190 on the port side and the bridle rings 192 on the starboard side, this in preparation for the succeeding purse seining operation, and/or for taking aboard the operating skiff 201 in preparation for return to port or to any fish receiving point. In the event the purse seiner 21 has completed purse seining operations and is returning to port, as just described, a retaining rope 205 is passed through the bridle rings 192 to snugly secure and stow the same in an orderly manner upon the turntable 199 and to prevent disarranging of same in rough weather. If desired and found convenient, the cable strap 203 may be utilized during its withdrawal from the bridle rings 192 for expediting the passing or threading of the retaining rope 205 therethrough, similarly, the latter may be utilized upon its removal or withdrawal from the bridle rings 192 for expediting the passing or threading the outer purse line section 185 therethrough in preparation for the net or purse seine setting and towing step of the succeeding purse seining operation.

Summarizing the foregoing, it should be here noted and observed, that by employing a purse seine winch of the type herein disclosed, the entire purse seining operation is co-ordinated and is under the complete and positive control of the single winch operator at all times, also that the tow line 89 and the sectional or two-part purse line 184 are either in service with the purse seine 189 or are compactly wrapped and/or stored upon their respective individually controlled drums 55 and 141, and finally by wrapping and storing the entire sectional or two-part purse line 184 upon the pursing and storage drum 141, as and in the manner hereinbefore set forth, such purse line 184 is readily accessible and available for service, as and when required.

Manifestly, therefore, the purse seine winch of the present invention is comparatively simple and extremely compact in construction; is easy to install and operate; is highly efficient in use; will not readily get out of order; and materially simplifies and accelerates purse seine fishing operations.

While I have herein shown and described the invention with sufficient detail to enable those skilled in the art to understand the mode of construction and the principles involved, it is to be understood that there are no intentional limitations herein to the specific form and precise details of construction herein disclosed, except as expressly defined by the appended claims and that various modifications of said construction may be resorted to without departing from the spirit of the invention or the benefits derivable therefrom. I also desire to have it understood that certain features of the invention herein disclosed may be employed in and with other combinations than those shown and described.

Having thus fully described my invention, what I claim as new and desire to secure by Letters Patent, is:

1. The combination in a purse seine winch mechanism, of a driven shaft having a cone clutch member rigidly secured thereto; an axially adjustable seine purse line drum revolubly mounted upon said driven shaft, said drum having an interiorly coned annular extension at one end thereof adaptable upon axial adjustment of the drum upon said driven shaft to frictionally engage said cone clutch member to thus drivably interconnect the drum with the driven shaft; and mechanism for effecting axial adjustment of the drum upon its shaft including an exteriorly threaded sleeve revoluble upon the driven shaft and held against axial movement thereon; a sleeve nut carried by the drum for threaded engagement with said sleeve; a pinion shaft; spur gearing interconnecting the revoluble exteriorly threaded sleeve with said pinion shaft; an operating handwheel slidingly splined upon said pinion shaft; and locking means carried by the pinion shaft and frictionally engageable with said handwheel for rendering the mechanism inoperative when the purse line drum is in either a clutched or declutched position.

2. A purse seine winch comprising a sectional casing including upper and lower sections; a driving shaft transversely journalled in the lower section of said casing; a pair of driven shafts transversely journalled in said casing in spaced parallel relation to each other at the juncture of the upper and lower sections of the casing and parallel to and in substantially symmetric relation on each side of said driving shaft; gearing drivably interconnecting the driving shaft with the driven shafts; axially spaced seine towing and pursing drums revolubly mounted upon one of said driven shafts; an elongated seine pursing and purse line storage drum similarly mounted upon the other of said driven shafts in substantially coextensive relation to said towing and pursing drums of the first mentioned driven shaft; clutch means individual to each of said drums for selectively interconnecting the same with their respective driven shafts; brake means for each of said drums; a purse seine tow line anchored at its inner end to the aforesaid towing drum and adapted to be wound and stored thereon when not in service; a two-part seine purse line adapted to be detachably secured at its outer end to said first mentioned pursing drum and to be anchored at its inner end to said elongated pursing and storage drum, whereby said two-part purse line is wound upon both of said pursing drums during seine pursing operations and subsequent thereto is entirely wound upon said elongated drum for storage thereon when not in service; and pairs of guide rollers carried by the aforementioned casing for leading said purse seine tow line and the outer part of said two-part seine purse line on and off their respective drums, one roller of each pair of guide rollers having its axis disposed in a horizontal plane and the other roller of each pair having its axis disposed in a vertical plane.

3. A purse seine winch comprising a rectangular sectional casing including upper and lower sections; a driving shaft transversely disposed and journalled within the lower section of said casing; a pair of driven shafts similarly disposed and journalled in said casing in spaced parallel relation to each other at the juncture of the upper and lower sections of the casing and parallel to and in substantially symmetric relation on each side of said driving shaft; a spur gear pinion rigidly secured to said driving shaft adjacent one end thereof; intermeshing spur gears rigidly secured to corresponding ends of said driven shafts, one of said spur gears being normally in mesh with said spur gear pinion; a seine tow line drum and a relatively short and axially adjustable seine purse line drum revolubly mounted upon one of said driven shafts in axially spaced relation, said tow line drum having one end thereof disposed in contiguous relation to the spur gear of its driven shaft; clutch means for drivably connecting said spur gear and tow line drum; clutch means adaptable upon axial adjustment of the aforesaid relatively short purse line drum upon its driven shaft to drivably interconnect said drum and shaft; an axially adjustable elongated seine purse line drum revolubly mounted upon the other of said driven shafts and disposed thereon in substantially co-extensive relation to said tow and relatively short purse line drums; clutch means adaptable upon axial adjustment of said elongated drum upon its driven shaft to drivably connect such drum with the spur gear on said shaft; adjusting mechanisms individual to the relatively short and elongated purse line drums for effecting axial adjustment of the same upon their respective driven shafts whereby the clutch means of said drums are activated and deactivated; and foot actuated brake mechanisms individual to each of said tow and purse line drums.

4. A purse seine winch comprising a rectangular sectional casing including upper and lower sections; a driving shaft transversely disposed and journalled within the lower section of said casing; a pair of driven drum shafts journalled and similarly disposed within said casing in spaced parallel relation to each other at the juncture of the upper and lower sections of said casing and parallel to and in substantially symmetric relation on each side of said driving shaft; a spur gear pinion rigidly secured to said driving shaft adjacent one end thereof; intermeshing spur gears rigidly secured to corresponding ends of said driven drum shafts whereby one of said gears normally meshes with said spur gear pinion; a seine tow line drum and an axially adjustable and relatively short seine purse line drum revolubly mounted upon one of said driven drum shafts in axially spaced relation thereon and with the outer end of said tow line drum in juxtaposition with the spur gear of its correlated shaft; a fluid-distensible clutch structure carried by said spur gear and adaptable upon distention to engage said tow line drum for drivably connecting the same to such spur gear; means for conducting pressure fluid to said structure for effecting distention of same, said means including a fluid pressure control valve; cone clutch means adaptable upon axial adjustment of said relatively short purse line drum upon its correlated drum shaft to drivably interconnect said drum and shaft; an axially adjustable and elongated seine purse line drum revolubly mounted upon the other of said driven drum shafts and disposed within the winch casing substantially co-extensively with said tow line and relatively short purse line drums; cone clutch means adaptable upon axial adjustment of said elongated drum upon its drum shaft to drivably connect such drum with the spur gear of said drum shaft; adjusting mechanisms individual to each of said purse line drums for axially adjusting the same upon their respective drum shafts and thereby effect clutching and declutching of such drums; foot actuated brake mechanisms individual to each of said tow line and purse line drums; and means releasably engageable with said purse line drums for preventing reverse rotation thereof during line winding operations and/or the inactive periods of same.

5. In a purse seine winch mechanism, the combination of a sectional housing; a driving shaft transversely journalled within said housing; a pair of driven shafts similarly journalled within said housing and drivably connected with said driving shaft; a seine tow line drum revolubly mounted upon one of said driven shafts; a clutch for drivably connecting said drum and shaft; an axially adjustable seine purse line drum revolubly mounted upon the same driven shaft in axially spaced relation to said seine tow line drum; a clutch member rigidly secured to said last mentioned driven shaft and adapted to be engaged by said purse line drum upon axial adjustment of the same to drivably connect such drum with its shaft; an axially adjustable elongated seine purse line drum revolubly mounted upon the other of said driven shafts; a clutch for said elongated drum adaptable upon axial adjustment of such drum to drivably connect the same with its shaft; means individual to each of said seine purse line drums for effecting axial adjustment of the same; and individual brake means for each of said seine tow and purse line drums.

6. In a purse seine winch mechanism, the combination of a sectional housing; a driving shaft transversely journalled within said housing; a pair of driven shafts similarly journalled within said housing and interconnected with and driven by said driving shaft; a seine tow line drum revolubly mounted upon one of said driven shafts and having a co-axial annular extension upon the outer end thereof; an axially adjustable and relatively short seine purse line drum revolubly mounted upon said driven shaft in axially spaced relation to said tow line drum and provided upon its inner end with a co-axial interiorly coned annular extension; fluid-distensible clutch means adapted to frictionally engage the annular extension of the seine tow line drum for drivably connecting the latter with its driven shaft; a cone clutch member rigidly secured to said last mentioned driven shaft and adapted upon axial adjustment of the seine purse line drum upon its driven shaft to be frictionally engaged by the interiorly coned annular extension of said drum for drivably connecting the latter with its shaft; an axially adjustable elongated seine purse line drum revolubly mounted upon the other of said driven shafts, said drum being provided at one end thereof with an interiorly coned annular extension; a cone clutch member rigidly secured to said other driven shaft and adaptable upon axial adjustment of said elongated drum upon its driven shaft to be frictionally engaged by the interiorly coned annular extension of said drum for drivably connecting the latter with its correlated shaft; means individual to each of said seine purse line drums for effecting axial adjustment of the same upon their respective drum shafts; and individual brake means for said seine tow and purse line drums.

References Cited in the file of this patent
UNITED STATES PATENTS

| Number | Name | Date |
|---|---|---|
| 1,464,623 | Lybeck | Aug. 14, 1923 |
| 1,648,671 | Belknap | Nov. 8, 1927 |
| 1,958,441 | Osgood | May 15, 1934 |
| 2,103,541 | Low | Dec. 28, 1937 |
| 2,270,507 | Clark | Jan. 20, 1942 |
| 2,391,939 | Bannister | Jan. 1, 1946 |
| 2,447,280 | Rowe | Aug. 17, 1948 |
| 2,522,377 | Kelley | Sept. 12, 1950 |
| 2,531,668 | Briggs | Nov. 28, 1950 |
| 2,543,765 | Davidson et al. | Mar. 6, 1951 |